(12) United States Patent
Svoboda et al.

(10) Patent No.: US 7,542,774 B1
(45) Date of Patent: Jun. 2, 2009

(54) SYSTEM AND METHOD FOR SELECTING INPUT

(75) Inventors: David B. Svoboda, Escondido, CA (US); Sachin Shirhatti, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 400 days.

(21) Appl. No.: 11/313,882

(22) Filed: Dec. 20, 2005

(51) Int. Cl.
*H04B 7/00* (2006.01)

(52) U.S. Cl. ........................... 455/500; 455/420

(58) Field of Classification Search ........................ None
See application file for complete search history.

(56) References Cited

U.S. PATENT DOCUMENTS

2002/0052182 A1* 5/2002 Mayuzumi ................... 455/41

* cited by examiner

*Primary Examiner*—Lester Kincaid
*Assistant Examiner*—Phuoc Doan

(57) ABSTRACT

Systems and methods for selecting an input source for data input to a wireless communication device are provided that allow a wireless communication device to be in active communication with one or more remote devices via wired or wireless links and receive input from a user through a remote device or through the user interface on the wireless communication device. The wireless communication device establishes an input source upon detection of the active communication link with the remote device and thereafter maintains an active input state to preserve a single input source during the session with the remote device. When the user switches the source of input, the wireless communication device detects the new input source, updates the active input state and provides the updated active input state to the remote device. Subsequent input from the new input source is thereafter received and processed and any subsequent input from a previous input source is discarded or buffered as appropriate.

24 Claims, 4 Drawing Sheets

SYSTEM AND METHOD FOR SELECTING INPUT

FIELD OF THE INVENTION

The present invention generally relates to wireless communication devices and more particularly relates to interactive communications between a wireless communication device and a remote device.

BACKGROUND OF THE INVENTION

Conventional wireless communication devices typically have the ability to be connected to a remote device that runs an application that may duplicate certain functions of the handset. For example, an application running on a remote device may include a contact manager that duplicates the ability to add, delete, modify, and otherwise manage the contacts on the handset. Many of the functions of the phone book on the handset are duplicated by the application on the remote device.

The problem with these types of remote device connections and functionality duplication is that state ambiguities can exist between the remote device and the handset if the user is allowed to change data through both the application on the remote device and the user interface on the handset. Additionally, ambiguities in state can be created when an application is running on the handset with the remote device providing the input to the application and an incoming call is answered by pressing a button on the handset keypad. Ambiguities in state may be catastrophic to the handset and require a complete power cycle to reset. These drawbacks of the conventional systems may result not only in the loss of data but may also result in the loss of an incoming call. Accordingly, what is needed is a system and method that overcomes these problems with the conventional systems.

SUMMARY OF THE INVENTION

Accordingly, described herein are systems and methods for selecting an input source for data input to a wireless communication device that is in active communication with a remote device via a wired or wireless communications link. The wireless communication device establishes an input source upon detection of the active communication link with the remote device and thereafter maintains an active input state to preserve a single input source during the session with the remote device. When the user switches the source of input, the wireless communication device detects the new input source, updates the active input state and provides the updated active input state to the remote device. Subsequent input from the new input source is thereafter received and processed and any subsequent input from a previous input source is discarded or buffered as appropriate.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for selecting an input source for data input to a wireless communication device that is in active communication with a remote device via a wired or wireless communications link. For example, one method as disclosed herein allows for a wireless communication device to establish a connection with a remote device and maintain an active input state to preserve a single input source during the session with the remote device. When a signal to change the input source is received by the wireless communication device, the device updates the active input state, communicates the new state to the remote device, and thereafter receives input from the new input source. Any subsequent input received from the old input source is either discarded or buffered, as appropriate.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
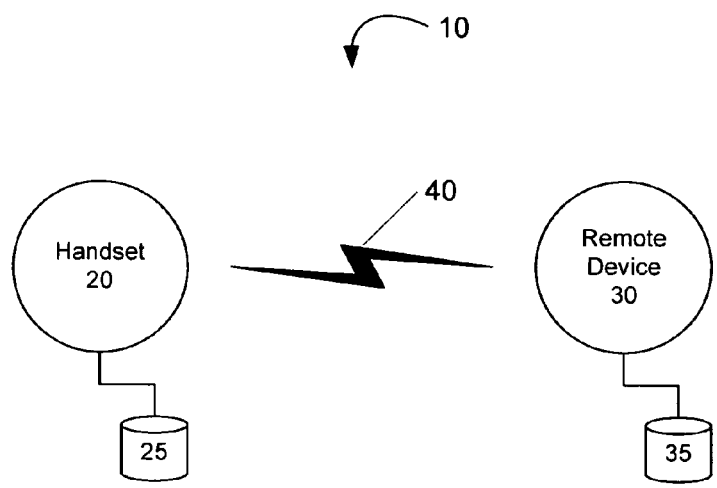
FIG. 1 is a block diagram illustrating an example system for selecting input according to an embodiment of the present invention.

FIG. 1 is a block diagram illustrating an example system 10 for selecting input according to an embodiment of the present invention. In the illustrated embodiment, the system 10 comprises a handset 20 configured with a data storage area 25 and a remote device 30 configured with a data storage area 35. The handset 20 and remote device 30 are in data communication through communication link 40. In alternative implementations, there may be more than just a single remote device, as will be understood by those having skill in the art. For the sake of simplicity of this description, however, the embodiment described will include a single remote device.

The handset 20 can be any of a variety of wireless communication devices, including a cell phone, personal digital assistant ("PDA"), laptop computer, or any combination of these and other devices capable of establishing a communication link 40 with a remote device 30. The remote device 30 can be any of a variety of computing devices including a personal computer ("PC"), server computer, a handset such as the handset 20 previously described, or any combination of these and other devices capable of establishing a communication link 40 with a handset 20.

The data storage areas 25 and 35 can be any sort of internal or external memory device and may include both persistent and volatile memories. The function of the data storage areas 25 and 35 is to maintain data for long term storage and also to provide efficient and fast access to instructions for applications that being executed by a handset or remote device.

The handset 20 and remote device 30 are communicatively coupled through a communication link 40. The communication link 40 can be a direct wired connection, for example through a serial or universal serial bus ("USB") connection. The communication link 40 may also be a direct wireless connection, for example through a Bluetooth or infrared connection. In an alternative embodiment, the communication link 40 may be an indirect wireless connection, for example a packet switched data connection through a wireless carrier network. The communication link 40 can also be an indirect wired connection, for example through a wired Internet connection to the handset 20.

Figure 2A:
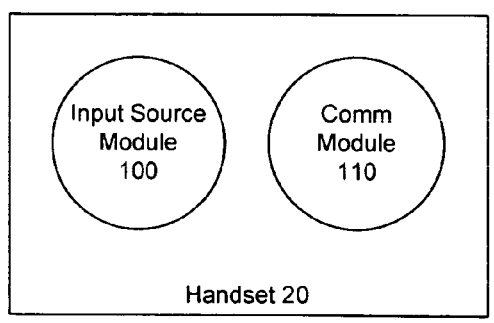
FIG. 2A is a block diagram illustrating an example handset that is part of a system for selecting input according to an embodiment of the present invention.

FIG. 2A is a block diagram illustrating an example handset 20 that is part of a system for selecting input according to an embodiment of the present invention. In the illustrated embodiment, the handset 20 comprises an input source module 100 and a communications module 110. The communication module 110 is configured to establish a communication link with a remote device. The communication link can be a wired or wireless link and can be a direct or indirect link. Advantageously, upon establishing a communication link with a remote device, applications housed in data storage on the handset 20 can be executed by the remote device and data input to the application can be provided by the remote device.

The input source module 100 is configured to track the active input state during an active connection between the handset 20 and any remote device. The active input state identifies what device is currently providing data input during the active connection. The input source module 100 maintains the active input state, for example, as a field in memory, and periodically sends the active input state to the remote device. Furthermore, upon a change of the data input source, the input source module 100 updates the active input state and provides the updated state information to any remote devices.

Advantageously, the input source module 100 may also control the processing of data input during an active connection between the handset 20 and the remote device. For example, when a the data input source changes, the input source module may immediately route any subsequent input from the prior data input source to a data storage area for later processing or discarding, as appropriate.

The input source module 100 also tracks the synchronization of the active input state between the handset 20 and any remote device(s). In one embodiment, the input source module may query a remote device to obtain the current state information from the remote device. Additionally, the input source module 100 can receive and process a request from a remote device for the current active input state or a request from a remote device to reset the active input state. For example, if the remote device detects ambiguity in the active input state, perhaps by receiving an updated active input state that is the same as its current state, the remote device can send a request to the handset 20 to reset the active input state. The input source module, upon receiving such a request, can determine the current input source and then reset the active input state and send the reset active input state to the remote device.

Figure 2B:
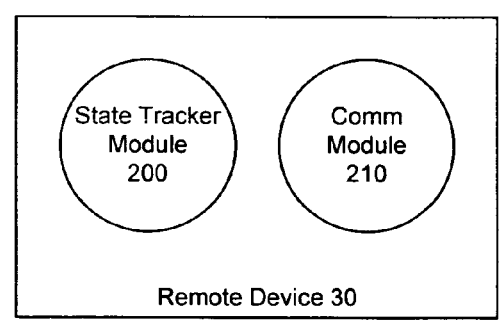
FIG. 2B is a block diagram illustrating an example remote device that is part of a system for selecting input according to an embodiment of the present invention.

FIG. 2B is a block diagram illustrating an example remote device 30 that is part of a system for selecting input according to an embodiment of the present invention. In the illustrated embodiment, the remote device 30 comprises a state tracker module 200 and a communication module 210. Similar to the communication module on the handset, the communication module 210 is configured to establish a communication link with a handset. The communication link can be a wired or wireless link and can be a direct or indirect link. Advantageously, upon establishing a communication link with a handset, the remote device 30 can access and execute applications housed in data storage on the handset 20 and be the source for data input to the application running on the handset.

The state tracker 200 is configured to track the active input state received from the handset during an active connection with the handset. The state tracker 200 can also compare subsequent state information received from the handset to ensure that there is no ambiguity in the current, previous, or new state. If any ambiguity is identified by the state tracker 200, it is configured to send to the handset a request to reset the state.

In one embodiment, the remote device 30 is passive with respect to state tracking and the state tracker module 210 allows the handset to be the master of the data input source and the active input state. In such an embodiment, the state tracker 210 passively stores the state information received from the handset 20 and complies with the current state. For example, the state tracker 200 may be configured to prevent user input on the remote device 30 when the active input state is other than the remote device 30.

Figure 3:
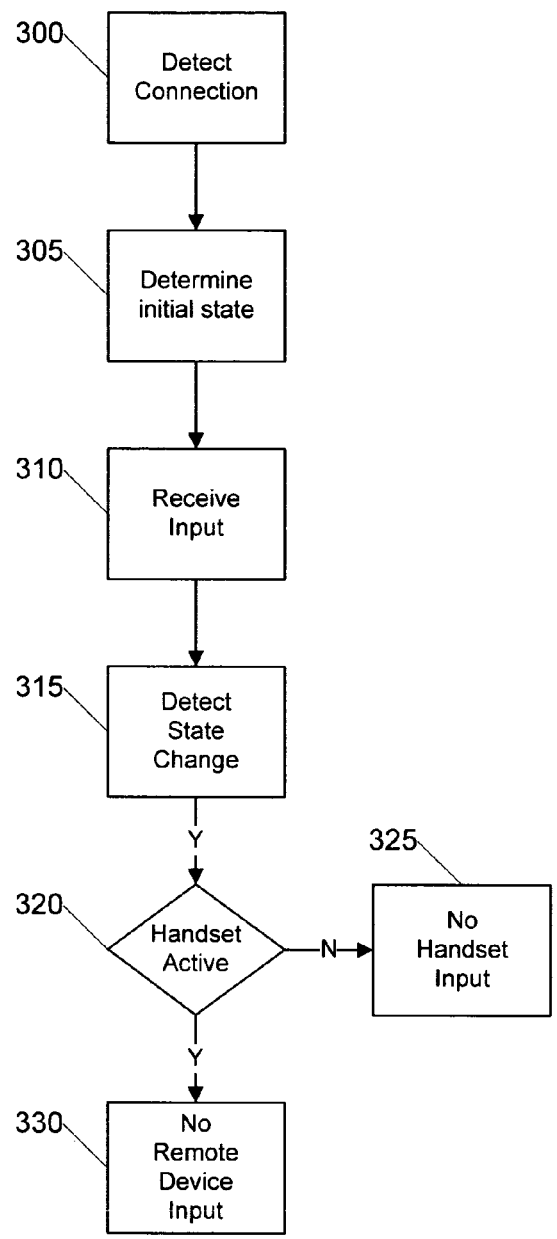
FIG. 3 is a flow diagram illustrating an example process for selecting input according to an embodiment of the present invention.

FIG. 3 is a flow diagram illustrating an example process for selecting input according to an embodiment of the present invention. Certain details and features have been left out of the flow chart of FIG. 3 that are apparent to a person of ordinary skill in the art. For example, a step may consist of one or more sub-steps or may involve specialized equipment or materials, as known in the art. While steps 300 through 330 are sufficient to describe one embodiment of the present invention, other embodiments of the invention may utilize steps different from those shown. In one embodiment, the illustrated process may be carried out by a handset such as the handset described with respect to FIGS. 1 and 2. Initially, in step 300, the handset detects a connection with a remote device. The connection may be a direct or indirect wired or wireless connection and may be one of a plurality of connections with remote devices.

Next, in step 305, the handset determines the initial active input state for the connection. The initial active input state can be determined by identifying the data input source and setting the active input state to the data input source. Advantageously, the initial active input state can be stored in data storage to maintain the state for the duration of the connection with the remote device.

Once the initial state is determined, the handset proceeds to receive data input in step 310. The data input can be received from either the handset or the remote device, in accordance with the identified data input source and active input state. Data input may continue for some time while the connection is active. For example, a remote device may connect with the handset and run an application on the handset (from the data storage area on the handset). The initial data input can be set to be the remote device and a user, through the remote device, may provide data input while interacting with the executing application. While the user continues to provide data input through the remote device, the active input state remains set to identify the remote device as the current data input source.

In step 315, the handset detects a change in the active input state. This change may be detected as a direct input from the user or as an incoming phone call, instant message, text message, or other type if interrupt. In one embodiment, the user of the handset can modify a set of user preferences that identify specific events as interrupt events that trigger a change in the active input state. Upon detecting a change in the active input state, the handset determines in step 320 if the handset is the new data input source. If the handset is not the new data input source, then in step 325 the handset restricts subsequent data input from the handset. In one embodiment, the handset may only restrict data input for the application that is running over the connection with the remote device. Alternatively, the handset may restrict all data input except for certain critical types of input such as a power off key or a state change key, for example.

If the handset is the new data input source, as determined in step 320, then the handset restricts subsequent data input from the remote device as shown in step 330. Advantageously, in either step 325 or step 330, when the handset it restricting data input from the handset or remote device, any data input received by the handset can be either discarded or saved for later execution as appropriate. For example, if a user is updating contacting information via a remote device and an incoming call is received by the handset, the active input state can change with the incoming call so that the user can press a button on the phone to answer the call. While the call is in process, the user may continue to edit contact information from the remote device and that information can be temporarily stored by the handset in a buffer memory or other data storage area. When the call is completed and the user changes the active input state back to the remote device, the buffered data received from the remote device during the call can then be processed by the handset to sustain continuity of the updated contact information before, during, and after the call.

Figure 4:
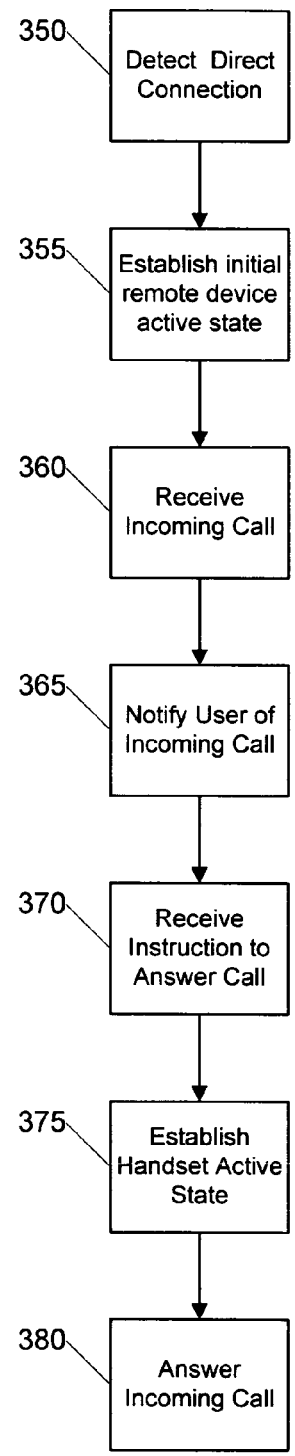
FIG. 4 is a flow diagram illustrating an example process for answering a call from a device active state according to an embodiment of the present invention.

FIG. 4 is a flow diagram illustrating an example process for answering a call from a remote device active input state according to an embodiment of the present invention. Certain details and features have been left out of the flow chart of FIG. 4 that are apparent to a person of ordinary skill in the art. For example, a step may consist of one or more sub-steps or may involve specialized equipment or materials, as known in the art. While steps 350 through 380 are sufficient to describe one embodiment of the present invention, other embodiments of the invention may utilize steps different from those shown. This process can be carried out by a handset such as those previously described with respect to FIGS. 1 and 2. Initially, the step 350 the handset detects a connection with a remote device. Next, in step 355 the handset initializes the data input source to indicate that the remote device is the data input source and sets the active input state accordingly. In step 360, an incoming call is received by the handset. The call may be any of a variety of communications, such as an SMS message, MMS message, voice call, data call, or other type of call.

Upon detecting the incoming call, in step 365 the handset next notifies the user of the incoming call. This may be done through the user interface on the handset or through an audible notice or other type of notice. In one embodiment, the handset may cause a notice to be displayed on the remote device. In response to the notice to the user, in step 370 the handset receives an instruction from the user to answer the incoming call. Accordingly, in step 375 the handset modifies the active input state to indicate that the handset is now the data input source and then in step 380 the handset answers the incoming call.

During the call, the handset is the data input source and therefore any input from the user to the handset during the call (e.g., raising or lowering the volume of the speaker) is immediately processed. In one embodiment, the handset may store input received from the previous data input source (i.e., the remote device) during the call so that no application related data is lost during the call when the handset is the data input source. After the call, the handset may be configured to automatically change the data input source (and active input state) back to the remote device, or the user may provide an instruction to the handset to effect the change.

Figure 5:
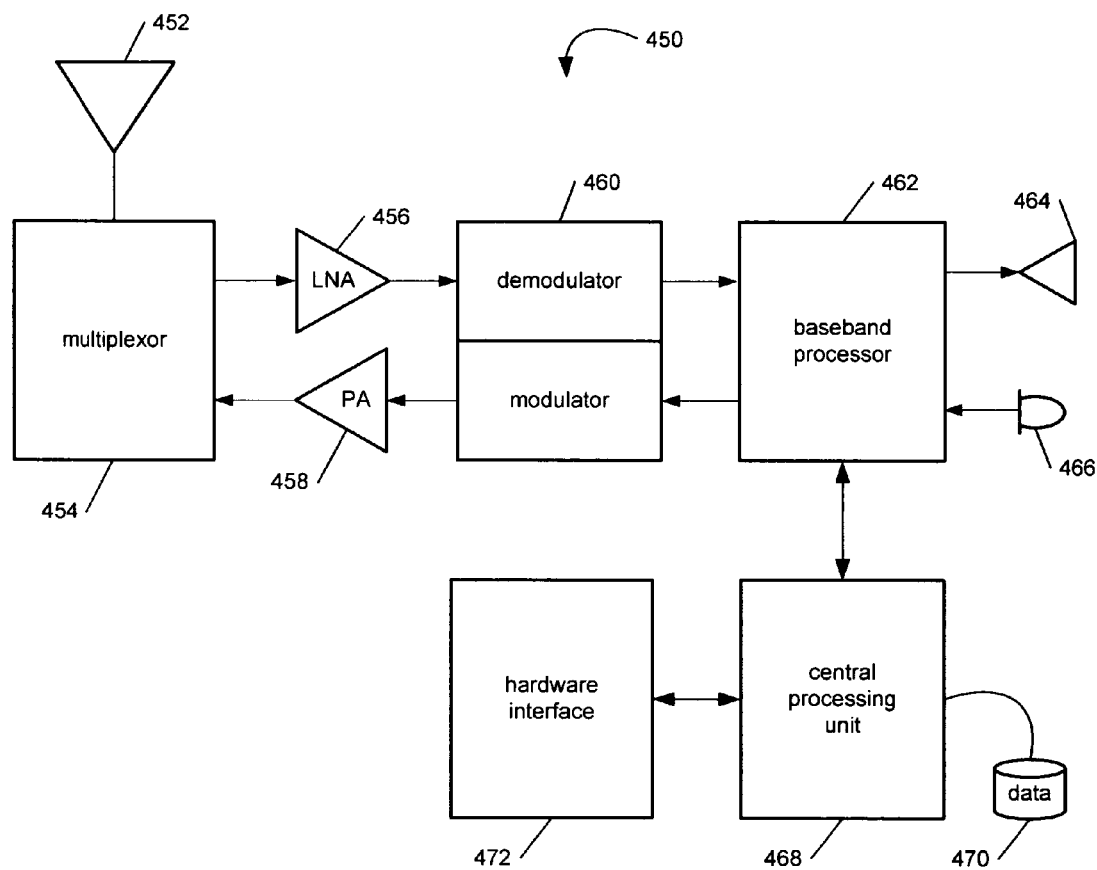
FIG. 5 is a block diagram illustrating an exemplary wireless communication device that may be used in connection with the various embodiments described herein.

FIG. 5 is a block diagram illustrating an exemplary wireless communication device 450 that may be used in connection with the various embodiments described herein. For example, the wireless communication device 450 may be used in conjunction with a handset as described above with respect to FIG. 1. However, other wireless communication devices and/or architectures may also be used, as will be clear to those skilled in the art.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described. For example, data storage area 470 may include an active module (not shown) that tracks the active input device while the wireless communication device 450 is connected to a remote device.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Figure 6:
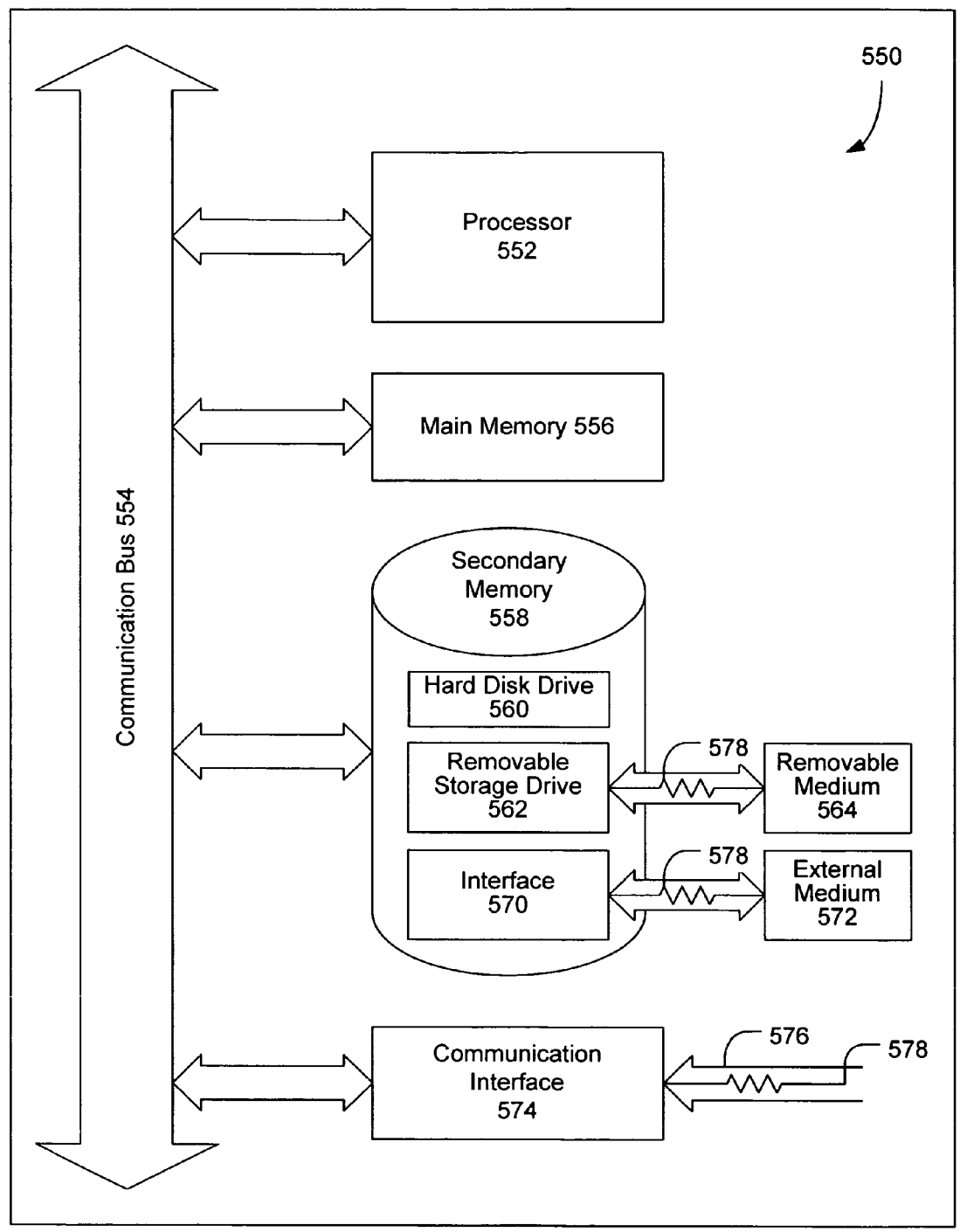
FIG. 6 is a block diagram illustrating an exemplary computer system that may be used in connection with the various embodiments described herein.

FIG. 6 is a block diagram illustrating an exemplary computer system 550 that may be used in connection with the various embodiments described herein. For example, the computer system 550 may be used in conjunction with a remote device as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/ Internet protocol ("TCP/IP"), serial line Internet protocol/ point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A computer readable medium storing computer implemented code for maintaining a single data input source to a wireless communication device in active communication with a remote device via a communications link, comprising computer readable code for:

establishing an active communication link with a remote device;
   identifying an initial data input source;
   initializing an active state field with the identified initial data input source;
   sending the initialized active state field to the remote device;
   receiving data input from the identified initial data input source;
   receiving an instruction to modify the data input source, the instruction comprising an identifier for the new data input source;
   updating the active state field with the identifier for the new data input source;
   sending the updated active state field to the remote device; and
   receiving data input from the new data input source, thereby restricting subsequent data input from the identified initial data input source to preserve the single data input source during active communication with the remote device.

2. The computer readable medium of claim 1, further comprising computer readable code for discarding subsequent data input from the initial data input source received after updating the active state field with the identifier for the new data input source.

3. The computer readable medium of claim 1, further comprising computer readable code for storing to a buffer memory subsequent data input from the initial data input source received after updating the active state field with the identifier for the new data input source.

4. The computer readable medium of claim 3, further comprising computer readable code for executing the stored subsequent data input from the initial data input source upon returning the active state field to the initial data input source.

5. The computer readable medium of claim 1, wherein the active communication link is a wireless communication link.

6. The computer readable medium of claim 5, wherein the wireless communication link is an infrared connection.

7. The method of claim 5, wherein the wireless communication link is an infrared connection.

8. The computer readable medium of claim 1, wherein the active communications link is a wired communication link.

9. The computer readable medium of claim 1, further comprising computer readable code for:

receiving a request to reset the active input state from the remote device;
   identifying a current data input source;
   updating the active state field with the current data input source; and
   sending the updated active state field to the remote device.

10. A wireless communication device, comprising:

a communication module configured to establish a direct data communication link with a remote device;
    a data storage area comprising an application configured to be executed by the remote device via an established direct data communication link; and
    an input source module configured to maintain an active input state during an established direct data communication link, where the input source module communicates the active input state to the remote device, wherein the input source module updates the active input state upon a change to a new data input source and provides an updated state information to the remote device, where the input source module routes subsequent input data from an initial data input source to the data storage area for subsequent processing to preserve a single data input source during the established direct data communication link.

11. The system of claim 10, wherein the input source module is further configured to maintain a single active input state for a plurality of remote devices.

12. The system of claim 10, wherein the input source module is further configured to maintain a plurality of active input states, wherein each active input state is for a separate remote device.

13. The system of claim 12, wherein each separate remote device is executing a different application in the data storage area on the wireless communication device.

14. The system of claim 10, wherein the input source module is further configured to reset the active input state in response to a request from the remote device.

15. The system of claim 10, wherein the input source module is further configured to query the remote device to obtain a current active input state according to the remote device.

16. The system of claim 15, wherein the input source module is further configured to identify an ambiguity in the active input state and reset the active input state in response to said identified ambiguity.

17. The system of claim 16, wherein the ambiguity is a lack of synchronization between the active input state on the wireless communication device and the remote device.

18. The system of claim 15, wherein the communication module is further configured to maintain simultaneous direct data communication links with a plurality of remote devices.

19. A method for maintaining a single data input source to a wireless communication device in active communication with a remote device via a communications link, comprising:

establishing an active communication link with a remote device;
    identifying an initial data input source;
    initializing an active state field with the identified initial data input source;
    sending the initialized active state field to the remote device;
    receiving data input from the identified initial data input source;
    receiving an instruction to modify the data input source, the instruction comprising an identifier for the new data input source;
    updating the active state field with the identifier for the new data input source;
    sending the updated active state field to the remote device; and
    receiving data input from the new data input source, thereby restricting subsequent data input from the identified initial data input source to preserve the single data input source during active communication with the remote device.

20. The method of claim 19, further comprising discarding subsequent data input from the initial data input source received after updating the active state field with the identifier for the new data input source.

21. The method of claim 19, further comprising storing to a buffer memory subsequent data input from the initial data input source received after updating the active state field with the identifier for the new data input source.

22. The method of claim 21, further comprising executing the stored subsequent data input from the initial data input source upon returning the active state field to the initial data input source.

23. The method of claim 19, wherein the active communication link is a wireless communication link.

24. The method of claim 23, wherein the wireless communication link is an infrared connection.

* * * * *